UNITED STATES PATENT OFFICE.

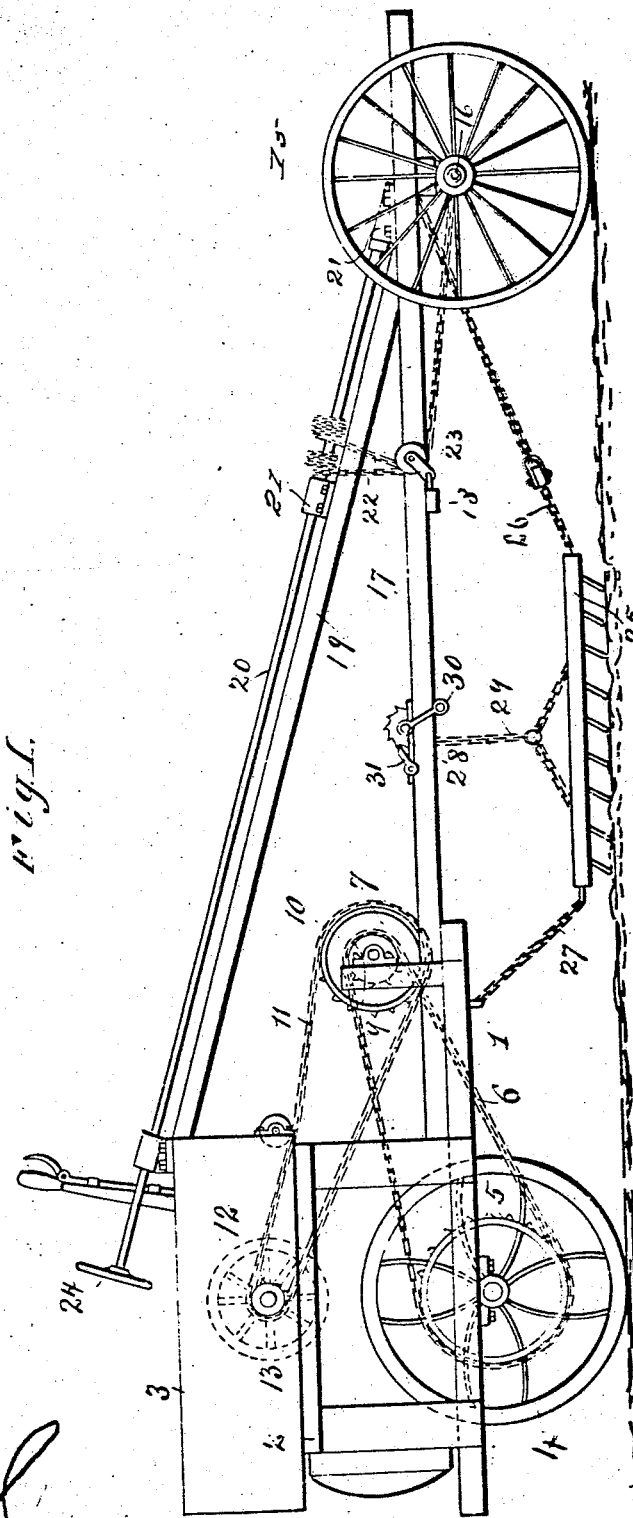

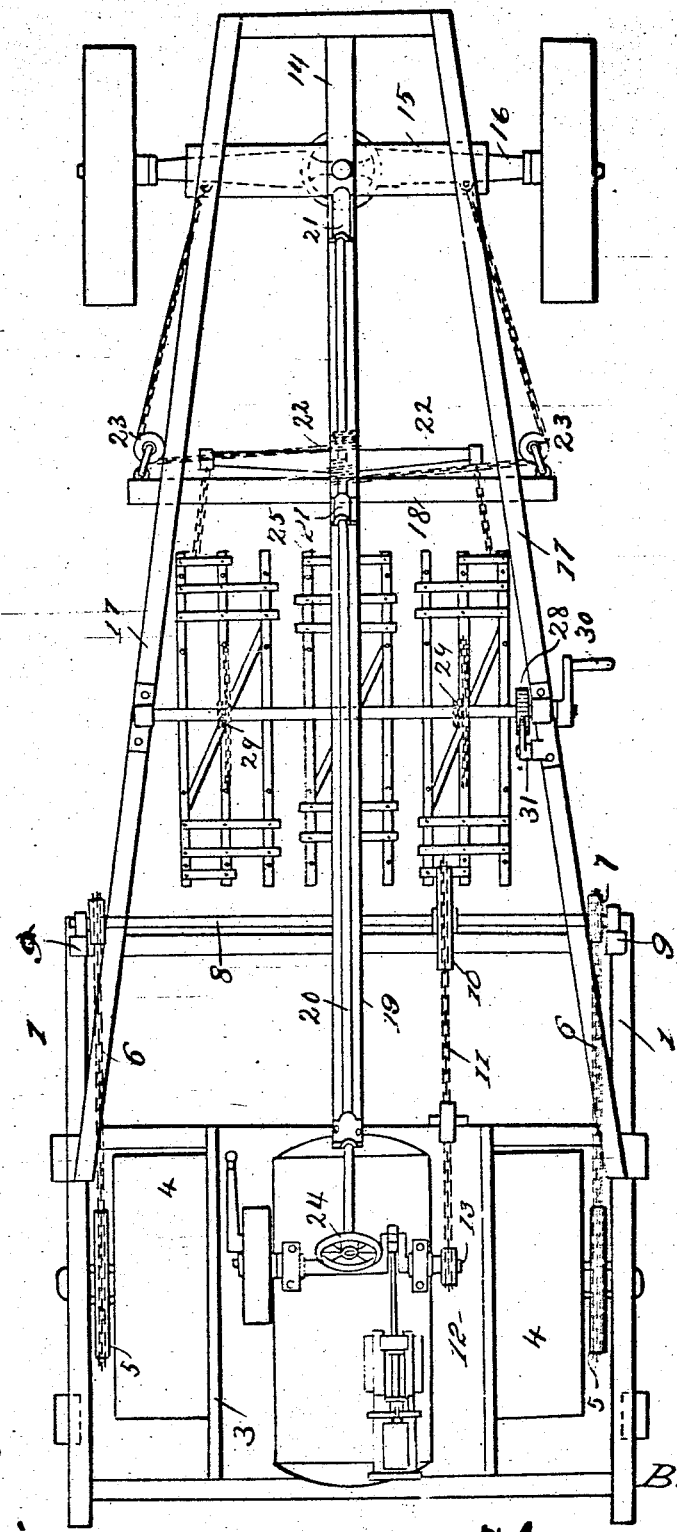

BERTON J. GODLEY, OF ROMULUS, NEW YORK.

MEANS FOR TILLING FIELDS.

No. 899,215.　　　Specification of Letters Patent.　　Patented Sept. 22, 1908.

Application filed January 14, 1908. Serial No. 410,821.

*To all whom it may concern:*

Be it known that I, BERTON J. GODLEY, citizen of the United States, residing at Romulus, in the county of Seneca and State of New York, have invented certain new and useful Improvements in Means for Tilling Fields, of which the following is a specification.

This invention comprehends certain new and useful improvements in means for tilling fields, and the invention relates particularly to an improved construction of self-propelled land roller arranged to travel over the fields to pulverize and level the soil and at the same time propel harrows, plows, or other agricultural implements over the fields to treat the same as desired.

The invention has for its object a durable and efficient construction of machine of this character, the parts of which are so arranged as to operate to the best advantage, and the invention consists in certain constructions and arrangements of the parts that I shall hereinafter fully describe and claim.

For a full understanding of the invention, reference is to be had to the following description and accompanying drawings, in which:

Figure 1 is a side elevation of my improved means for tilling fields; and, Fig. 2 is a top plan view thereof.

Corresponding and like parts are referred to in the following description and indicated in all the views of the drawings by the same reference characters.

Referring to the drawings, the numeral 1 designates the main framework of my improved self-propelled agricultural machine, said framework being of any desired construction and design and embodying longitudinal sills and front and rear cross-bars, as shown, and an elevated platform 2 upon which the prime mover, such as a gasolene engine or the like is mounted, the same, in the present instance, being contained within a casing 3. The framework 1 is mounted on a field roller 4. To either one or both sides of the roller 4 sprocket wheels 5 are connected, and chains 6 pass around said sprocket wheels and over similar, relatively small wheels 7 on the outer ends of a countershaft 8, said shaft being journaled in suitable boxings secured to upright posts 9 projecting upwardly from the front end of the framework. On the shaft 8 is another sprocket wheel 10 which is connected by a chain 11 to a sprocket 12 on the main driving shaft 13 of the engine or motor, so that the engine will impart power to the machine to propel different agricultural implements over the fields, while at the same time the fields are rolled by the roller 4.

A relatively long reach 14 is secured to and extends forwardly from the main supporting framework 1 and is connected at its front end to the bolster 15 supported upon the front axle 16, as clearly illustrated in the drawings.

17 designates hounds that are secured to the framework as shown and converge forwardly, being secured at their front ends to the opposite sides of the reach 14.

18 designates a cross-bar which is secured to the hounds and reach near the front ends of the former. A relatively long obliquely extending brace 19 is secured at its front to the forward end of the reach 14 and extends rearwardly and upwardly therefrom in vertical alinement with the reach, the rear end of said brace being secured to any desired portion of the supporting framework 1. A steering post 20 is supported at one end in a socket or bearing in the forward end of the reach 14 and projects rearwardly above the brace 19, being supported intermediate of its ends by said brace, as indicated at 21, and steering chains 22 are wound around said steering post 20 in opposite directions and diverge laterally and pass around pulleys 23 supported by the ends of the cross-bar 18, the said chains thence extending forwardly as shown and being connected at their front ends to the ends of the front axle 16. A steering wheel 24 is mounted on the rear end of the steering post 20 and it will thus be seen that as said wheel is turned either to the right or to the left, one or the other of the chains 22 is wound on the post 20 and the other unwound therefrom so as to turn the machine in one direction or the other and properly guide it over the fields.

As has been above stated, it is the object of my invention to propel a harrow or other drag or agricultural implement of any desired type over the fields, and in the present instance, I have shown a toothed harrow 25 as the implement operated by my improved traction or land roller. The harrow 25 is mounted between the front traveling wheels and the roller 4 in a relatively large space that is provided for it by the extended reach 14 and its hounds 17. A draft chain 26 is connected to the front end of the harrow 25 and to the bolster 15, and a backing chain 27 may be secured to the rear end of the harrow frame and to another suitable portion of the main supporting framework 1. Obviously the harrow or other implements employed may be used individually, or in gangs. In order to hold the harrow suspended or out of contact with the ground when the machine is traveling along the road, I provide hoisting means which in the present instance consists of a hoisting shaft or winch 28 journaled in bearings supported by the hounds 17 and reach 14, a flexible suspension member such as a chain 29 being arranged to be wound on said winch and connected to the harrow frame so that by turning the handle 30, the harrow may be raised off the ground and held elevated in the desired position by the pawl and ratchet device 31.

It is obvious that in addition to the harrow or other agricultural implement secured to the traction engine or land roller between the front heads and roller 4 thereof, I may use plows or other implements and connect them to the rear end of the main supporting framework 1 so as to trail them over the fields as the machine advances.

From the foregoing description in connection with the accompanying drawings, it will be seen that I have provided an improved means for tilling fields by harrows or other implements in connection with a land or field roller and that the implements may be conveniently carried from one field to another and along the road in suspended relation to the traveling support or traction engine, without the necessity of providing the implements themselves with traveling wheels.

Having thus described the invention, what is claimed as new is:

1. A machine of the character described, comprising a main supporting framework, a roller upon which the said framework is mounted, front traveling wheels and an axle therefor, a reach extending from the supporting framework to the front axle, hounds secured to said framework and reach, an agricultural implement mounted between the front traveling wheels and roller, draft chains connected to the implement and extending forwardly and upwardly and connected to the reach and hounds, a backing chain secured to the rear end of the implement and extending upwardly and rearwardly of the framework, hoisting chains connected to the implement, and a transversely extending hoisting shaft journaled in the hounds above the implement and provided at one end with a turning handle and pawl and ratchet device, the hoisting chains winding on said shaft.

2. A machine of the character described, comprising a main supporting framework, a roller upon which said framework is mounted, front traveling wheels and an axle therefor, a reach extending from the supporting framework to the front axle, hounds secured to said framework and to the reach, an agricultural implement mounted between the front traveling wheels and roller, underneath the hounds and reach, a transversely extending winding shaft journaled in the hounds above the said implement, suspension chains connected to the implement and adapted to wind on said shaft, and draft connections between the implement and the reach and hounds.

3. A machine of the character described, comprising a supporting framework, a roller on which said framework is mounted, means for driving said roller to propel the machine, a reach extending forwardly from the framework, a front axle, traveling wheels supporting the front end of said reach and journaled on said axle, hounds connected to said framework and to the reach, a rearwardly and upwardly extending brace 19 secured at its front end to the forward end of the reach and secured at its rear end to the supporting framework, and means for steering the machine, said means including a steering post secured at one end in a bearing in the forward end of the reach, and projecting rearwardly above the said brace to the supporting framework, said post being supported intermediate of its ends by said brace.

In testimony whereof I affix my signature in presence of two witnesses.

BERTON J. GODLEY. [L. S.]

Witnesses:
KATHARINE WHITE,
HARRY W. OGDEN.